United States Patent [19]
Knapp et al.

[11] Patent Number: 5,326,963
[45] Date of Patent: Jul. 5, 1994

[54] ELECTRO-OPTIC BARCODE READER

[75] Inventors: Herbert C. Knapp, Holliston; Vance A. Parker, Princeton; Larry K. Baxter, Marblehead, all of Mass.; Jon F. Evans, Litchfield, N.H.

[73] Assignee: Kronos Incorporated, Waltham, Mass.

[21] Appl. No.: 956,726

[22] Filed: Oct. 2, 1992

[51] Int. Cl.5 .............................. G06K 7/10
[52] U.S. Cl. ............................ 235/472; 235/462
[58] Field of Search ..................... 235/472, 462

[56] References Cited

U.S. PATENT DOCUMENTS

| | | | |
|---|---|---|---|
| 3,827,809 | 8/1974 | Nash | 356/200 |
| 3,872,329 | 3/1975 | Dodson, III | 307/311 |
| 3,875,419 | 4/1975 | Harms, Jr. | 250/568 |
| 3,886,328 | 5/1975 | Harms, Jr. et al. | 235/61.11 E |
| 3,911,270 | 10/1975 | Traub | 235/472 |
| 4,092,525 | 5/1978 | Daboub et al. | 325/463 |
| 4,130,819 | 12/1978 | Engelmann | 340/146.3 AC |
| 4,323,772 | 4/1982 | Serge | 235/463 |
| 4,682,016 | 7/1987 | Inoue | 235/472 |
| 4,704,519 | 11/1987 | Kulikauskas | 235/472 |
| 4,801,789 | 1/1989 | Davis | 235/472 |
| 4,866,258 | 9/1989 | Ueda et al. | 235/472 |

Primary Examiner—Harold Pitts
Attorney, Agent, or Firm—Weingarten, Schurgin, Gagnebin & Hayes

[57] ABSTRACT

An optical assembly and electronic reader circuit cooperate to provide a highly-efficient and low-cost electro-optic barcode reader. The optical assembly includes a shielded housing, a photo detector and optical elements disposed about an un-folded optical path that provide a virtual reading window at one end of the housing whose field of view, which is focused to a point at the photo detector, is shaped to be no wider than constitutive barcode indicia. The electronic reader circuit includes a pulse amplifier and manual-adjustment-free average D.C. offset negative feedback and A.C. information peak detect negative feedback loops that respectively maintain the electrical pulse stream input to the pulse amplifier within the dynamic range thereof and eliminate electrical pulse stream peak noise. A circuit is coupled to a comparator with hysteresis square-up stage to deactivate the comparator in the state of no input signal.

27 Claims, 3 Drawing Sheets

ELECTRO-OPTIC BARCODE READER

FIELD OF THE INVENTION

This invention is directed to the field of radiant energy, and more particularly, to a novel electro-optic barcode reader.

BACKGROUND OF THE INVENTION

Barcodes are standardized patterns of marks and spaces that are widely used for identification of goods and persons, among other things. The marks and spaces of the barcodes are in the form of indicia of variable reflectivity, some being light while others are dark. So-called "quiet zones" of high-reflectivity lead and trail the marks and spaces that serve to initialize and terminate the barcodes.

To read the barcodes, light is irradiated on a reading window where the barcodes are to be present, such as the channel through which a bar-coded badge is swiped, and as each bar code is moved through the reading window light reflected off the quiet-zones and off the marks and spaces of variable reflectivity is deviated to a light detector. The electrical pulses of the detector correspond in pattern and intensity to the incident light. The electrical pulses are typically amplified in an amplifier, squared-up in a comparator with hysteresis and digitally decoded.

The heretofore known barcode optical assemblies that implemented the functions of irradiating the reading window and deviating the reflected light to the photo detector typically included an aperture stop of size less than the minimum width of the marks and spaces and a folding mirror to deviate the reflected light onto a large-area photo detector. However, the utility of the heretofore known optical assemblies has been limited by the fact that the elements of the optical train including the aperture stop and folding mirror were difficult to align and to maintain in alignment, which resulted in undesirable time and labor costs during manufacture, and from the need to provide various separate metallic "shields" about the elements of the optical assembly in order to prevent noise from disrupting the operation of the photo detector, which often resulted in expensive as well as ungainly designs.

The heretofore known barcode reader circuits that implemented the amplification and pulse squaring-up functions typically included a high-gain amplifier connected to a comparator configured with hysteresis. The utility of the heretofore known barcode reader circuits was limited, however, by the fact that manual adjustment of potentiometers was required to bring the voltage swings of the photodiode output pulses to within the dynamic range of the amplifier, which resulted in undesirable time and labor costs during manufacture, from the fact that the amplifier typically was driven beyond saturation to eliminate from the photo detector pulses peak noise, which often resulted in erroneous output transitions, (disrupting the decoding of the message), and from the fact that the comparator configured with hysteresis tended to "latch" in the absence of signal, which resulted in error in downstream digital signal processing.

SUMMARY OF THE INVENTION

It is accordingly one object of the present invention to provide a barcode reader optical assembly whose optical elements are self-aligning along an un-folded optical path and whose housing is self-shielding against stray light and ambient electrical noise. In accord therewith, mating housing portions are disclosed that define an enclosed channel and that overlap to lock ambient light therewithout. The walls of the housing portions are impregnated with energy-absorbing material and themselves absorb ambient electromagnetic energy. The walls of the channel are controllably serrated and the surfaces of the walls are selectively texturized to diffuse and to reflect light away from the axis of the channel. First and second optical elements, preferably cylindrical lenses, are mounted in spaced-apart relation along the axis of the channel. The lenses are cooperative to image a virtual reading window at one end of the housing whose field of view is sized to be smaller than the minimum standardized dimensions of the marks and spaces of the barcodes to be read. A photo detector is mounted along the axis of the channel at the other end of the housing. The photo detector, preferably a small-area photo detector, is positioned at the focal point of the virtual reading window.

It is another object of the present invention to provide a barcode reader circuit of the type that includes a photodiode, an amplifier and a pulse-shaping comparator configured with hysteresis that automatically maintains the photodiode output pulses within the dynamic range of the amplifier without any need for manual adjustment of potentiometers, that automatically eliminates peak noise from the photodiode output pulses and compensates barcode labels of varying reflectivity without driving the amplifier to saturation and that automatically drives the comparator configured with hysteresis to its "off" state to prevent digital signal processing errors. In accord therewith, an average D.C. offset negative feedback means is disclosed that responds to the average D.C. value of the photodiode output pulses and so feeds at least a portion of it back negatively to the amplifier as to automatically maintain the photodiode output pulses within the dynamic range of the amplifier and compensating for barcode reflectivity. An information peak detecting negative feedback means is disclosed that responds to the A.C. amplitude swings of the photodiode output pulses and so feeds at least a portion thereof back negatively to the amplifier as to "clip" the peaks of the photodiode output pulses thereby removing peak noise without saturating the amplifier and compensating for barcode reflectivity. A discharge circuit is disclosed that is coupled to the comparator with hysteresis to drive it to its "low" state in the absence of signal to prevent possible digital signal processing error.

BRIEF DESCRIPTION OF THE DRAWINGS

These and other objects, features and advantages of the present invention will become apparent as the invention becomes better understood by referring to the following solely exemplary and non-limiting detailed description of the preferred embodiments thereof, and to the drawings, wherein.

DETAILED DESCRIPTION OF THE PREFERRED EMBODIMENT

Figure 1:
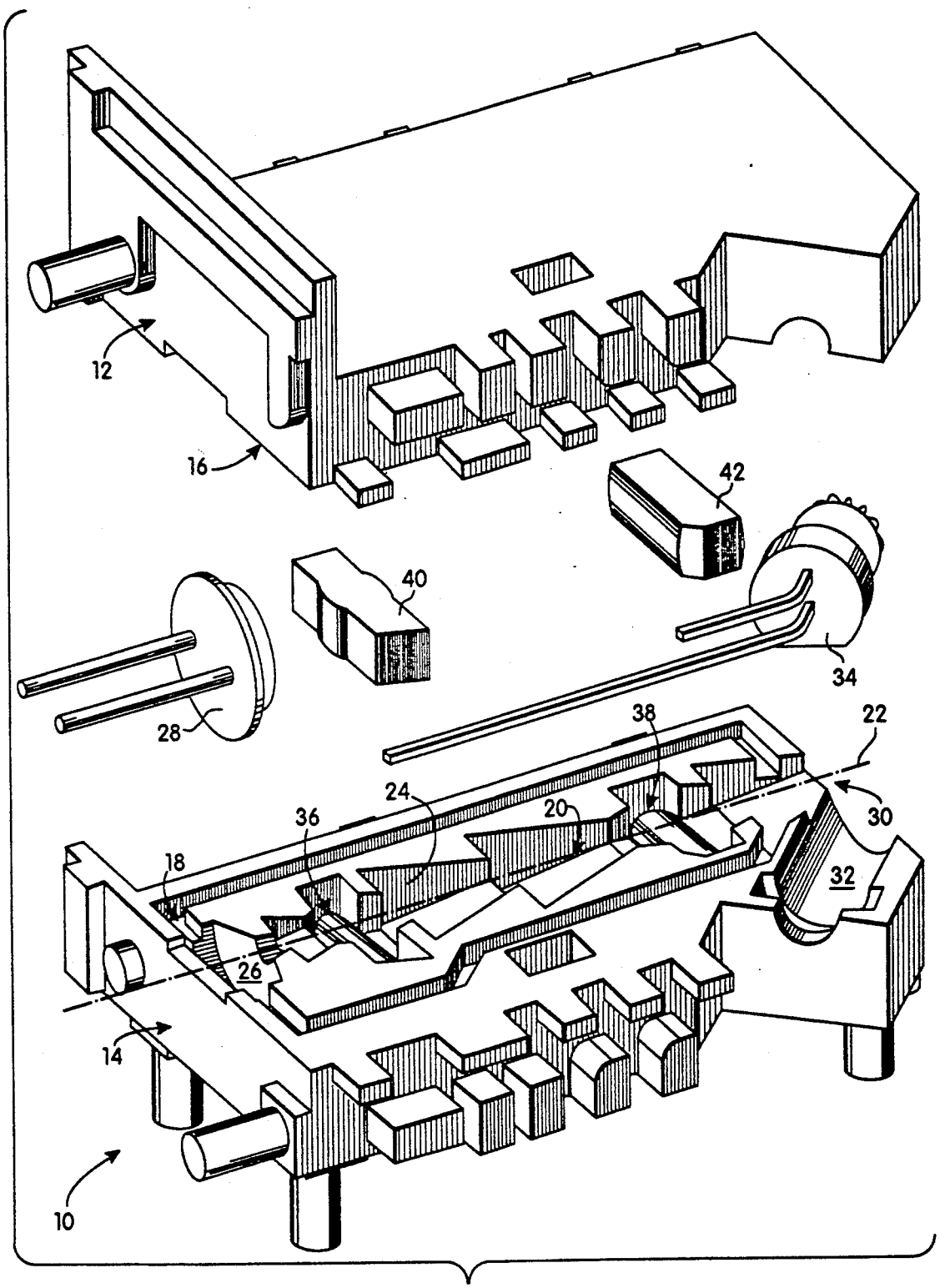
FIG. 1 is an exploded perspective view of a barcode optical assembly of the electro-optic barcode reader in accord with the present invention.

Referring now to FIG. 1, generally designated at 10 is an exploded perspective view of a barcode optical assembly of the electro-optic barcode reader in accord with the present invention. The optical assembly 10 includes mating housing portions generally designated 12, 14, that, when in mated condition, provide a compact reader body that may be mounted either horizontally or vertically.

In the preferred embodiment, the housing portions 12, 14 are generally rectangularly-shaped, and, in order to provide a light-tight interior environment, the abutting edges of the housing portions 12, 14 are preferably provided with a complementary tongue and groove arrangement respectively generally designated 16, 18. While the tongue and groove arrangement 16, 18 is presently preferred, other mechanical light-sealing arrangements may be employed without departing from the inventive concept.

The confronting inside walls of the housing portions 12, 14 of the barcode optical assembly 10 define a channel generally designated 20 that extends about a longitudinal axis schematically illustrated by dashed line 22 within the optical assembly 10. The inside walls of the housing portions 12, 14 defining the channel 20 are controllably serrated as at 24 to reflect any stray light that may be present in the channel 20 in directions that are off the axis 22. The inside walls of the housing portions 12, 14 defining the channel 20 are selectively textured, preferably by an electronic drilling machine, to provide a surface finish that both absorbs any stray light that may be present in the channel 20 and diffuses it in directions that are off the axis 22. The serrations 24 and the textured surface of the inside walls of the channel 20 cooperate to ensure that substantially all of the stray light that may be present in the channel 20 does not travel in a direction that is coaxial with the axis 22 of the channel.

The mating housing portions 12, 14 are provided with inside walls defining a recess generally designated 26 at one end of the optical assembly 10 centered about the optical axis 22 that is shaped to receive a photo detector 28 and to retain it securely therewithin. The mating housing portions 12, 14 are provided with side walls defining an opening generally designated 30 at the end of the assembly 10 opposing the photodiode receiving recess 26 and along the axis 22 of the channel 20. The opening 30 provides a barcode reading region through which light reflected off a barcode as it is swiped past the opening 30 passes into the channel 20 and is incident to the photo detector 28.

The mating housing portions 12, 14 are provided with inside walls defining a cavity generally designated 32 at the same side of the optical assembly 10 where the opening 30 is located and in open communication therewith that is shaped to receive a photoemitting diode 34 and to retain it securely therewithin. The axis of the cavity 32 is angled relative to the axis 22 of the channel 20 to enable the light emitted by the photodiode 34 to be incident to the barcode reading region, and is preferably angled at a forty-five (45) degree angle thereto.

The photo detector 28 is preferably a custom photo detector diode having a five (5) mil diameter circular active area commercially available from United Detector Technology (UDT) and the photoemitter 34 is preferably a Siemans SFH 487 IR emitting diode that is lensed with a twenty (20) degree half-angle, an eight hundred and eighty (880) nm wavelength and a radiant intensity of twenty to forty (20–40) mW/sr at one hundred (100) ma of forward current. The photo detector diode 28 is sensitive to the same wavelength as the emitter diode 34. Other photo detectors having a small active area and photo detectors having large photoareas, as well as other photoemitters, may be employed without departing from the inventive concept.

The inside confronting walls of the mating housing portions 12, 14 define lens receiving recesses generally designated 36, 38 that are in spaced-apart relation along the axis 22 of the channel 20 in positions intermediate the photodetector 28 and the opening 30. The recesses 36, 38 respectively receive and retain therein first and second optical elements respectively designated 40, 42. The optical elements 40, 42 preferably are plastic (acrylic) cylindrical lenses that, when mounted in their respective recesses 36, 38, the surfaces of the lenses are disposed at right-angles to each other along the optical path 22 of the channel 20 to thus provide a pair of so-called crossed cylindrical lenses. That is, a longitudinal axis of the cylindrical portion of the optical element 40 is disposed at a 90° angle relative to a longitudinal axis of the cylindrical portion of the optical element 42.

The lenses 40, 42 cooperate to image a virtual barcode reading window that is co-located with the barcode reading region at the end of the mating housing portions 12, 14 where the opening 30 is located. The field of view of the virtual barcode reading window has a length and width dimension, where the length dimension is sized to be just bigger than and where the width dimension is sized to be smaller than the minimum standardized size of the marks and spaces of the barcodes to be read. In the preferred embodiment, the field of view of the virtual barcode reading window is elliptically shaped, and is sized to be about twenty five (25) mil by two and one-half (2.5) rail. The field of view of the virtual reading window is focused by the lenses 40, 42 to a five (5) mil circle on the photo detector 28, and the curvature of the cylindrical lenses 40, 42 is selected to provide the virtual reading window with a depth of field sufficient to accommodate different thickness badges without distortion. Other lenses that provide other selectively-shaped virtual reading windows other than the elliptical section of the presently preferred embodiment may be employed without departing from the instant invention, so long as the lenses or other optical elements so shape the virtual reading window that the "width" dimension of its field of view is no bigger than the minimum standardized dimensions of the marks and spaces of the barcodes to be read and not so small that it responds to voids, spots and other surface irregularities on the badges having the barcodes to be read.

The material of the housing portions 12, 14 of the optical assembly 10 is preferably a plastic material, such as ABS, into which an energy-absorbing material, such as carbon particles, may be disbursed at a density and of a size sufficient to absorb at least some of the stray light that may be present in the channel 20 and to provide a measure of shielding against electrical noise. While carbon particles are presently preferred, other energy-absorbing materials such as metal filaments may be employed without departing from the inventive concept.

In operation of the optical assembly 10, the light emitted by the photoemitter 34 about the forty five (45) degree angle to the axis 22 of the channel 20 illuminates the barcode reading region in the channel, not shown, through which the bar-coded badge to be read is swiped. As the badge is swiped therethrough, the light of the photoemitter is incident to the marks and spaces of the barcode thereon and it is differentially absorbed by the variable reflectivity indicia thereof. The virtual reading window provided by the optical elements 40, 42 images the differentially absorbed light reflected off the barcode back along the axis 22 and directly to its focal point that is located at the active area of the photo detector 28. Any off-axis light in the channel is absorbed and/or reflected off-axis by the controlled serrations 24 of the walls of the channel 20 and by the selected texturization of the surface thereof enabling the photo detector 28 to respond only to the intensity of the reflected light within the virtual reading window provided by the lenses 40, 42. The photo detector 28 responds to the changing intensity of the reflected light imaged thereon by means of the virtual reading window and produces a series of pulses that conform in pattern to the pattern of the reflected light returned off the barcode as the card is swiped through the channel.

Figure 2:
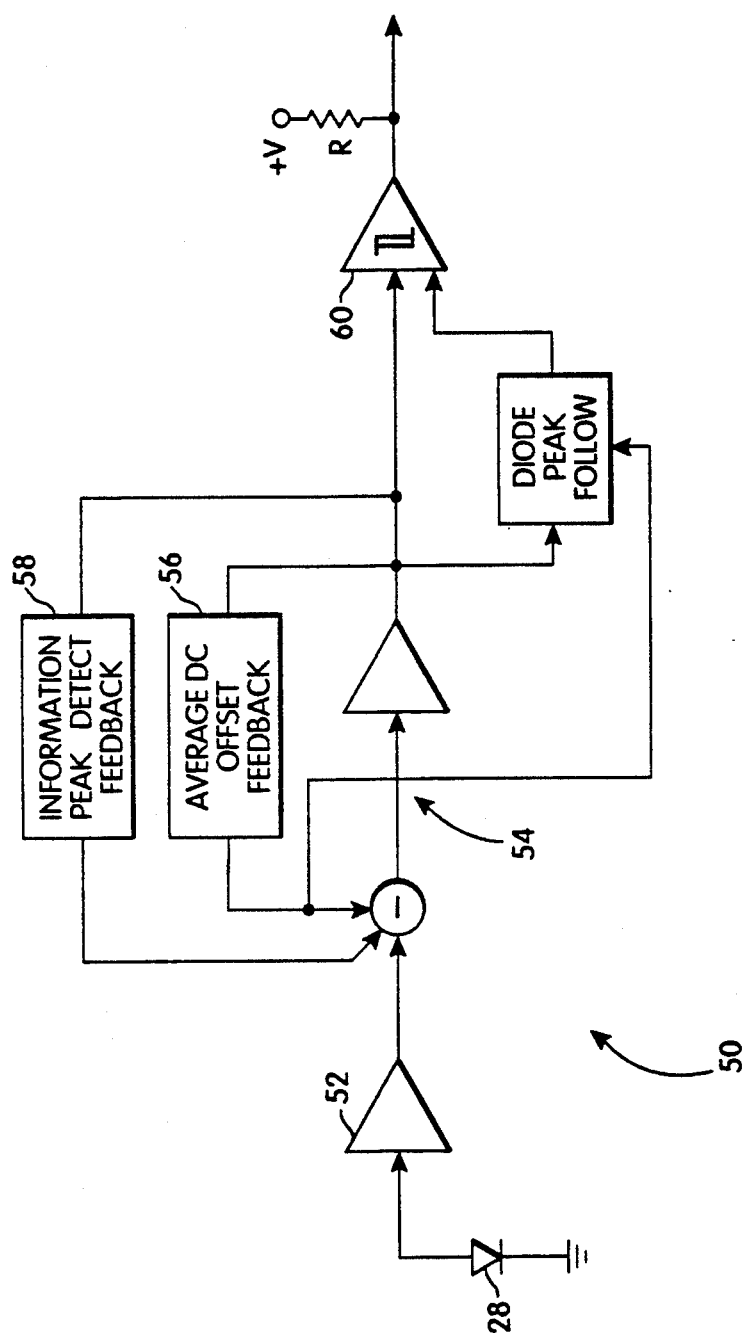
FIG. 2 is a block diagram of a barcode reader circuit of the electro-optic barcode reader in accord with the present invention.

Referring now to FIG. 2, generally designated at 50 is a block diagram of the barcode reader circuit of the electro-optic barcode reader in accord with the present invention. The circuit 50 includes an amplifier 52 that has the IR photo detector diode 28 (FIG. 1) connected to its input. The amplifier 52 presents a high input impedance and a low noise to the pulse stream of the photo detector 28 and initially amplifies the pulse stream. The amplified pulse stream has an average D.C. level that depends on the characteristics of the bar-coded badges to be read, as well as having characteristics that depend on variation in photodiode and photo detector components. The amplified pulse stream also has A.C. peak noise that is occasioned by the high-reflectivity areas of the quiet zones, as well as by irregularities in the reflective surface of the bar-coded badges to be swiped and variations in position as the card is swiped through the channel.

The amplified pulse stream is passed through a negative summing amplifier generally designated 54. An average D.C. offset negative feedback loop 56 to be described is connected to the amplifier 54 that is operative to keep the amplified pulse stream out of the summing amplifier 54 within the dynamic range of the summing amplifier independently of the particular characteristics of the actual circuit components. An information peak detect negative feedback loop 58 to be described is connected to the amplifier 54 that is operative to remove the peak noise from the amplified pulse stream and adjust for data (badge/optical) DC average differences. Both loops 56, 58 are manual-adjustment-free. The conditioned and amplified pulse stream is then passed through a comparator 60 provided with hysteresis that squares-up the amplified pulse stream and provides at its output a well-behaved digital pulse stream whose highs and lows correspond to the particular marks and spaces and "quiet zones" of the barcode that has been read.

Figure 3:
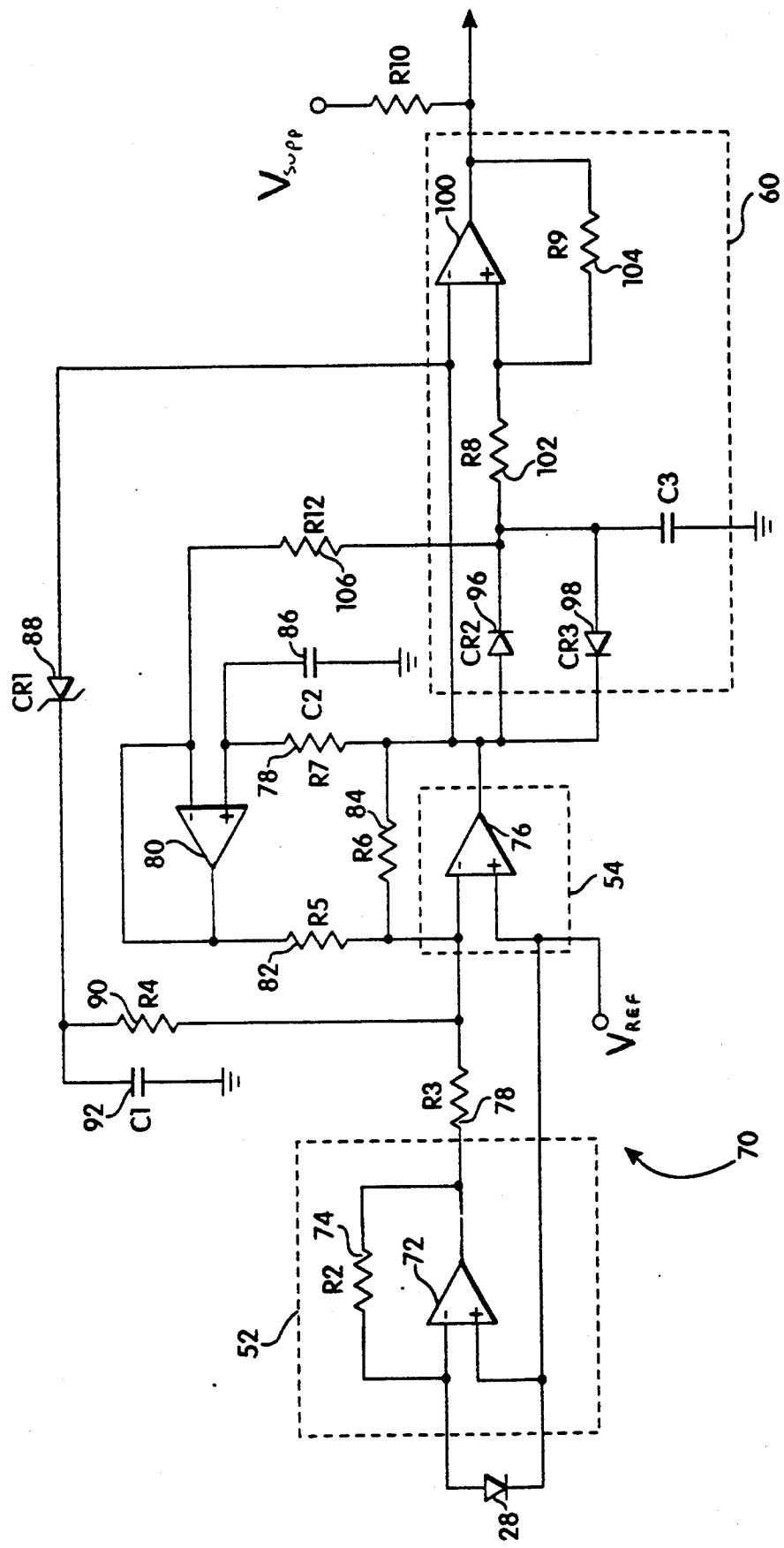
FIG. 3 is a schematic diagram of a preferred embodiment of the barcode reader circuit of the electro-optic barcode reader in accord with the present invention.

Referring now to FIG. 3, generally designated at 70 is a schematic circuit diagram of the barcode reader circuit of the electro-optic barcode reader in accord with the present invention. The input amplifier 52 preferably includes a MOSFET front-end op-amp 72, preferably the RCA CA 3240, that has its non-inverting and its inverting inputs connected across the photo detector. A resistor 74 marked "R2" provided between its output and its inverting input sets the amplifiers' gain. Any amplifier other than the RCA CA 3240 op amp that has high input impedance and low noise may be employed.

The summing amplifier 54 is preferably a bi-polar op amp 76, connected with its inverting input to the output of the amplifier 72 via a resistor 78 marked "R3", and with its non-inverting input to the non-inverting input of the op amp 72. The non-inverting inputs of the op amps 72, 76 are each coupled to a reference voltage $V_{REF}$. The bi-polar op amp 76 preferably is a LM 358-type op amp, which provides both the bandwidth and the noise performance, at a low cost, that is sufficient for the amplified photodetector pulse stream. The op amp 76 is D.C. coupled to the op amp 72 via the resistor 78, which allows good sensitivity to the signals produced by very slowly-swiped barcoded badges. In the preferred embodiment, the A.C. gain of the op amp 76 is set at about three hundred (300).

The average D.C. offset negative feedback loop 56 (FIG. 2) is constituted by a resistor 78 marked "R7" that is coupled between the output of the op amp 76 and the non-inverting input of a buffer 80 configured as a voltage-follower, which has its inverting input connected to its output, by a resistor 82 marked "R5" connected between the output of the buffer 80 and the inverting input of the op amp 76, and by a feedback resistor 84 marked "R6" connected across the output and the inverting input of the amplifier 76. A capacitor 86 marked "C2" is connected between the non-inverting input of the buffer 80 and ground.

The information peak detect negative feedback loop 58 (FIG. 2) is constituted by a diode 88 marked "CR1" connected between the output of the op amp 76 and the inverting input thereof via a series resistor 90 marked "R4" across which a capacitor 92 marked "C1" is hung to ground, and the feedback resistor 84.

The square-up stage 60 (FIG. 2) is constituted by a pair of back-to-back shunt diodes 96, 98 respectively marked "CR2" and "CR3" connected between the output of the op amp 76 and the non-inverting input of a comparator 100, whose inverting input is connected directly to the output of the op amp 76. A resistor 102 marked "R8" is connected in series between the shunt diode pair 96, 98 and the non-inverting input of the comparator 100. A feedback resistor 104 marked "R9" is connected between the output of the comparator 100 and the non-inverting input thereof. The output of the comparator 100 is coupled to a first electrode of a pull-up resistor R10. A second electrode of the pull-up resistor R10 is coupled to a supply voltage $V_{supp}$. An anti-latching resistor 106 marked "R12" is connected between the non-inverting input of the buffer 80 and the non-inverting input of the comparator 100. The comparator 100 preferably is a bi-polar comparator of the LM 393 type.

The average D.C. offset negative feedback loop operates as follows. The resistor capacitor pair 78, 86 provide an R/C circuit with a very slow time constant, preferably about one (1) second, that settles to the average D.C. level of the summing amp 76 and feeds at least a part of it back through the MOSFET op amp buffer 80 configured as a voltage follower through the resistor 82 to the inverting input of the amplifier 76, which decreases the D.C. gain of the summing amplifier stage 54, ensuring that the signals being fed to the square-up stage 60 are within the dynamic range of the summing amplifier 54. In this way, the circuit has a high A.C. gain, but its D.C. gain is low enough to keep the average D.C. output of the summing amplifier 54 to within a few millivolts of its input, and thereby within the dynamic range of the amplifier 76 no matter the D.C. level of the photodiode pulse stream.

The information peak detect negative feedback loop operates as follows. The positive-going signals at the output of the summing amplifier 54 cause the diode 88 to quickly charge the capacitor 92 to within about eight-tenths (0.8) volts of their maximum amplitude. This signal is fed back to the inverting input of the summing amplifier 76 through the resistor 90, whereby signals of varying amplitudes are clipped to a level of about one diode drop, peak. The capacitor 92 holds this peak D.C. voltage throughout the length of the barcode signal, allowing the signals low-going A.C. components to be passed without attenuation. In this manner, the information peak detect negative feedback loop compresses all signals to the same amplitude, and flattens the often erratic average D.C. components that accompany them. In addition, it flattens the tops of the D.C. plateaus produced by the "quiet zones" at the beginning and ends of a stream of barcode data, caused by light reflection from the surface of the card upon which the barcode label is fixed, which can cause problems at the square-up stage.

The operation of the square-up stage 60 is as follows. The output of the summing amplifier 76 is fed directly to the inverting input of the bi-polar comparator 100, as well as being fed into the pair of back-to-back diodes 96, 98, which charge the capacitor 98 to the positive and negative peaks of its information signal. The output of the back-to-back diodes 96, 98 is fed to the non-inverting input of the comparator 100 through the resistor 102 which, along with the feedback resistor 104, sets the square-ups hysteresis, at a level of about twenty (20) mVpp in the preferred embodiment. The comparator 100 squares-up the summing amplifiers amplified pulse stream around a D.C. level which approximately tracks the half-way point between its peaks, regardless of the erratic nature of the signal. The output of the square-up stage is an open-collector with a pull up resistor, which ensures proper TTL output levels.

The resistor R12 acts as follows to turn the comparator 100 to its high state. The output is normally-high. That is, high for black barcode bars and low for white. If the output inadvertently is low at the end of a (corrupted) barcode read, resistors R9 and R8 would normally proceed to discharge C3 further than during the datastream, therefore "latching" the comparator output low permanently (or until more data is read). The resistor R12 counteracts the effects of R8 and R9, charging C3 back toward the DC feedback voltage (buffered by OP amp 80), which ensures that comparator 100's output eventually returns high.

Many modifications of the presently disclosed invention will become apparent to those skilled in the art having benefitted from the instant disclosure without departing from the inventive concepts.

What is claimed is:

1. A barcode reader for reading barcodes having a plurality of interspaced marks of minimum standardized dimensions, comprising:

a housing having an interior channel having an axis and a capacity having an axis, the channel and cavity both in open communication with a barcode reading region defined at a preselected location of said housing wherein the channel and the cavity are disposed such that the axis of the cavity is angled relative the axis of the channel;

a photo-detector having an active area, said photo-detector mounted within said housing and in communication with said channel;

a photo-emitter disposed in the cavity such that said photo-emitter emits light directly at said barcode reading region; and at least one optical element having at least one curved surface, said at least one optical element disposed in said channel of said housing to define a virtual optical window co-located at said barcode reading region, said at least one optical element having a field of view of a preselected shape selected to be no bigger than the minimum standardized dimension of the interspaced marks of the barcodes to be read and having a focal point originating at the active area of the photo-detector.

2. The invention of claim 1, further comprising a second optical element having at least one curved surface, said second optical element disposed a first predetermined distance from said at least one optical element with the curved surface of the second optical element disposed at a 90° angle with respect to the at least one curved surface of the at least one optical element and wherein said housing includes first and second mating housing portions that, when mated together, are in light-sealing relation.

3. The invention of claim 1, wherein said housing has walls in which matter is embedded that absorbs light.

4. The invention of claim 1, wherein said housing has walls in which matter is embedded that absorbs electrical noise.

5. The invention of claim 3, wherein said matter includes carbon particles.

6. The invention of claim 4, wherein said matter includes carbon particles.

7. The invention of claim 1, wherein said housing channel defines a channel axis, and wherein said housing has walls defining said interior channel that are controllably serrated to deviate stray light within the housing off-axis of the channel.

8. The invention of claim 1, wherein said housing channel defines a channel axis, and wherein said housing has walls defining said interior channel that are selectably texturized to deviate stray light within the housing off-axis of the channel.

9. The invention of claim 1, wherein said housing has ends, and wherein said preselected location at which said barcode reading region is defined is selected to be at one of said ends of said housing.

10. The invention of claim 1, wherein said active area of said photo detector is a small-area active area.

11. The invention of claim 9, wherein said photo detector is an IR photo detector whose small-area active area is selected from a range of dimensions of from four (4) to six (6) mils.

12. The invention of claim 11, wherein said small-area active area is selected to be substantially five (5) mils in diameter.

13. The invention of claim 1, wherein said interior channel of said housing defines an axis, and wherein said photoemitter is located off-axis of the channel.

14. The invention of claim 13, wherein said off-axis location of said photoemitter is forty-five (45) degrees off-axis.

15. The invention of claim 1, wherein said at least one optical imaging element within said channel of said housing defines an un-folded optical path between said barcode reading region of said housing and said photo detector.

16. The invention of claim 1, wherein said at least one optical imaging element includes first and second spaced-apart cylindrical lenses that cooperate to provide an elliptically shaped field of view.

17. The invention of claim 16, wherein said elliptically-shaped field of view is shaped with a width dimension selected from a range of width dimensions of from 0.002 to 0.004 inches and is shaped with a length dimension selected from a range of length dimensions of from 0.025 to 0.050 inches.

18. The barcode reader optical assembly of claim 1: wherein said photo-detector provides an electrical pulse stream whose pattern and average D.C. value corresponds to the pattern and intensity of a stream of light pulses incident to the photo-detector and wherein said barcode reader further comprises:;
   an amplifier coupled to the photo-detector for amplifying the electrical pulse stream;
   a summing amplifier coupled to the amplifier for further amplifying the amplified electrical pulse stream, for removing from the further amplified electrical pulse stream at least a portion of the average D.C. value of the amplified electrical pulse stream in order to maintain the amplified electrical pulse stream within the dynamic range of the summing amplifier, and for removing peak noise from the amplified electrical pulse stream and compensating for badge reflectivity; and
   a square-up stage coupled to the summing amplifier and responsive to the further amplified electrical pulse stream whose average D.C. value is within the dynamic range of the summing amplifier and from which peak noise has been removed for providing a digital pulse stream of uniform intensity whose pattern corresponds to the pattern of the stream of light pulses incident to the photo-detector;
   said summing amplifier including an average D.C. offset negative feedback loop that includes a low-pass filter which passes A.C. components from the amplified electrical pulse steam while blocking D.C. components from the amplified pulse stream to provide said further amplified electrical pulse stream from which at least a portion of the average D.C. value has been removed;
   said summing amplifier further including an information peak detect negative feedback loop that includes a quick charge and slow discharge circuit that follows the A.C. component of the amplified electrical pulse stream and substracts off therefrom all A.C. signal above a selected magnitude to provide said further amplified electrical pulse stream from which peak noise has been removed.

19. The invention of claim 18, wherein said amplifier is a high-impedance MOSFET op amp.

20. The invention of claim 18, wherein said summing amplifier is a bipolar op amp.

21. The invention of claim 18, wherein said square-up stage includes a comparator configured with hysteresis.

22. The invention of claim 21, wherein said comparator configured with hysteresis includes two (2) back-to-back diodes.

23. The invention of claim 21, further including means for putting the comparator in its "off" state in the absence of light pulses incident to said photo-detector.

24. The invention of claim 21, wherein said putting means includes a resistor connected back to the DC average circuit, of value low enough to counteract the resistance of the hysteresis circuit.

25. The invention of claim 18, wherein said low-pass filter includes an RC circuit in a negative feedback loop about the summing amplifier.

26. The invention of claim 25, further including a buffer in series with said RC circuit.

27. The invention of claim 18, wherein said quick charge and slow discharge circuit includes a diode and series resistor coupled in a negative feedback loop about said summing amplifier, with a capacitor hung off the series resistor to diode connection to ground.

* * * * *

UNITED STATES PATENT AND TRADEMARK OFFICE
CERTIFICATE OF CORRECTION

PATENT NO. : 5,326,963
DATED : July 5, 1994
INVENTOR(S) : Herbert C. Knapp, et al.

It is certified that error appears in the above-indentified patent and that said Letters Patent is hereby corrected as shown below:

Column 10, line 31, "The invention of claim 21" should read --The invention of claim 23--.

Signed and Sealed this

Thirty-first Day of January, 1995

Attest:

BRUCE LEHMAN

Attesting Officer    Commissioner of Patents and Trademarks